United States Patent [19]
Akers

[11] Patent Number: 6,028,272
[45] Date of Patent: Feb. 22, 2000

[54] LOCKABLE POSITION INTERLOCK FOR RACKABLE CIRCUIT BREAKERS

[75] Inventor: Stuart R. Akers, Raleigh, N.C.

[73] Assignee: Siemens Power Transmission & Distribution, Inc., Wendell, N.C.

[21] Appl. No.: 08/850,173

[22] Filed: May 2, 1997

[51] Int. Cl.[7] .............................. H01H 9/22; H01H 9/24
[52] U.S. Cl. .................................. 200/50.26; 200/50.21; 200/50.24
[58] Field of Search ............................. 200/17 R, 50.01, 200/50.02, 50.09, 50.17, 50.19, 50.21, 50.23, 50.24, 50.26; 361/605–609, 615, 616

[56] References Cited

U.S. PATENT DOCUMENTS

| | | | |
|---|---|---|---|
| 4,202,028 | 5/1980 | Baird | 361/343 |
| 4,206,329 | 6/1980 | Jarosz | 200/50 AA |
| 4,236,189 | 11/1980 | Yosida | 361/337 |
| 4,298,852 | 11/1981 | Maier et al. | 335/6 |
| 4,744,001 | 5/1988 | Krafft et al. | 361/338 |
| 4,761,521 | 8/1988 | Beck et al. | 200/50 AA |
| 5,278,722 | 1/1994 | Peruso | 361/606 |

OTHER PUBLICATIONS

Siemens Brochure entitled 5kV and 15kV Metal–Clad Switchgear (Type GM), pp. 1–50, Bulletin SG3258–01, © 1996 Siemens Energy & Automation, Inc.

Siemens Brochure entitled 5kV and 15kV Vacuum Circuit Breakers (Type GMI), pp. 1–40, Bulletin SG3268–03, © 1995 Siemens Energy & Automation, Inc.

*Primary Examiner*—Michael Friedhofer

[57] ABSTRACT

A lockable circuit breaker racking mechanism is provided with a breaker type detection mechanism preventing locking and removal of the key unless the correct breaker type has been installed. The same locking mechanism can also be used to secure the racking mechanism in the trip-free position.

25 Claims, 5 Drawing Sheets

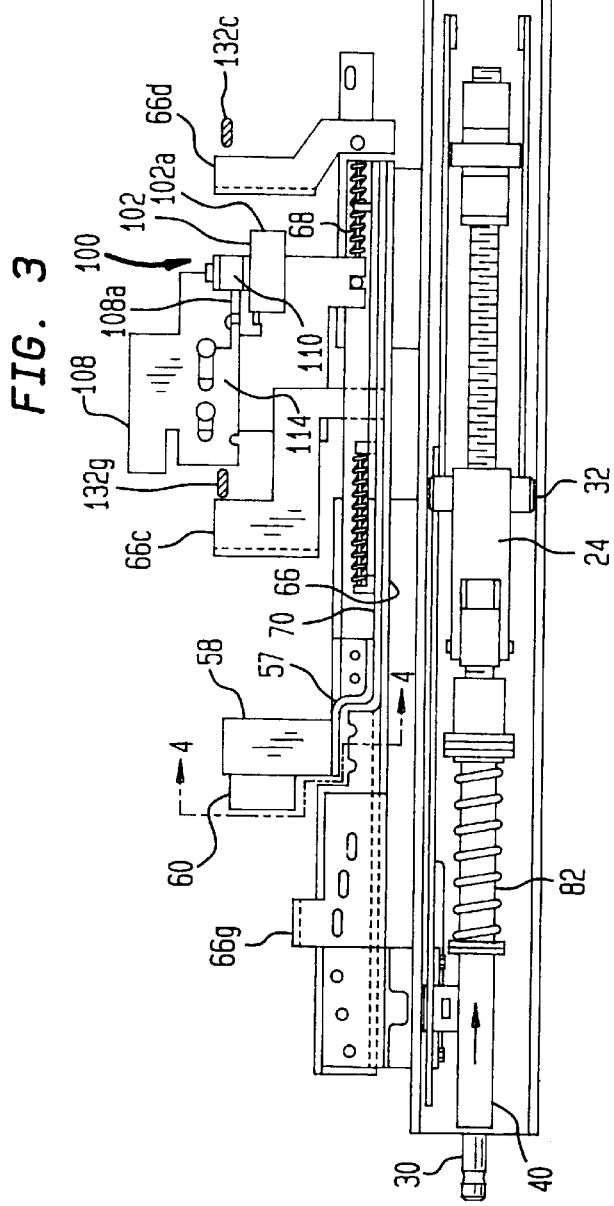

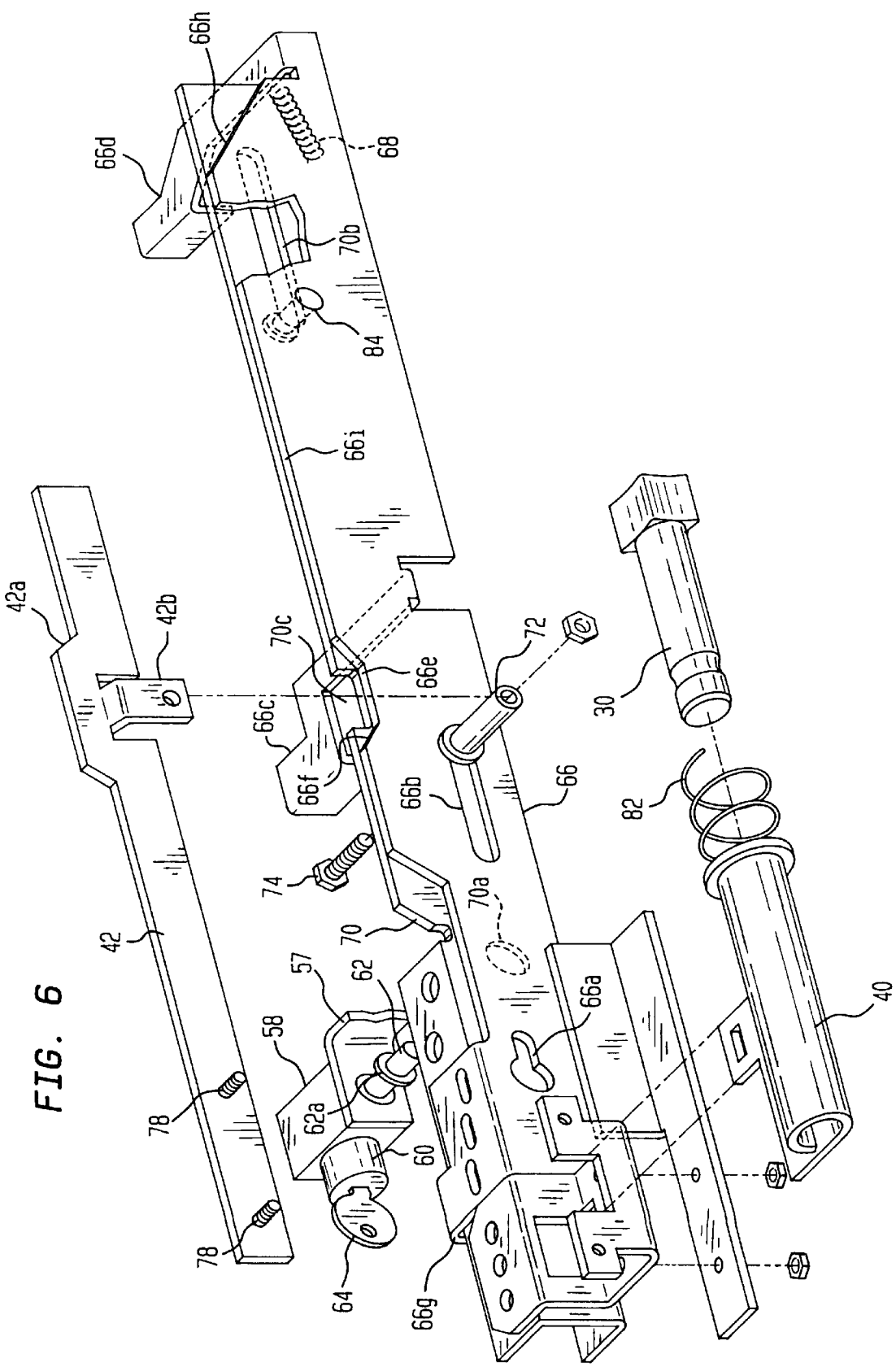

LOCKABLE POSITION INTERLOCK FOR RACKABLE CIRCUIT BREAKERS

FIELD OF THE INVENTION

This invention relates to improved locking mechanisms for rackable circuit breakers, providing increased flexibility at lower cost than prior art mechanisms.

BACKGROUND OF THE INVENTION

Most homeowners will be familiar with circuit breakers as typically employed in home wiring. Home circuit breaker assemblies typically provide two main breakers connecting the power lines to two bus bars, connected to line power, and extending the length of a breaker housing. Individual circuit breakers can then be snap-fit into place, such that one of the contacts controlled by the mechanism of the breaker is connected to the appropriate bus bar. The switch mechanism of the breaker can then be thrown by hand to make or break the contact between the bus bar and the load terminal to which the load is connected, and of course, the switch mechanism disconnects automatically upon detection of an overload. As noted, breakers of relatively low capacity, up to on the order of fifty amperes, are connected by hand to the bus bars assembly.

The functions provided by circuit breakers typically employed at substations and the like, to connect transcontinental power lines and the like with factories, housing developments, and the like, are generally similar, but have much higher voltage and current ratings.

The art is well aware that it is important to provide mechanisms for insuring that such breakers cannot be physically connected between the line and load when the breaker is in the contacts-closed position, i.e., the breaker must be maintained "trip-free" during the installation process. Moreover, the art shows means for prevention of removal of an installed breaker while in the contacts-closed position; this prevents a breaker from being physically moved out of a circuit including an active load, which can cause damage.

Further, the art teaches that it is desirable to provide a keyed locking mechanism for securing breakers in various positions, including not only the active or "Connect" position in which the breaker is connected to the line and load connections, but also in the "Test" position, wherein the contacts can be closed for testing, and the "Disconnect" position, in which the breaker is placed when initially installed, and from which the breaker can be removed. For example, locking the breaker in the Disconnect position allows maintenance operations to be carried out "downstream" of the breaker.

Since high capacity breakers are usually heavy, mechanical mechanisms are provided for "racking", i.e., physically moving, a breaker initially placed in the Disconnect position through the Test and into the Connect position. Typically, interlocks are used to insure both that the breaker cannot be racked into the Connect position while its contacts are closed (for the reasons mentioned above), and also to ensure that only breakers having capacity appropriate for the associated circuits can be racked into the connected position. The racking mechanism is mounted in a "cubicle", for moving the breaker toward or away from line and load terminals disposed within the cubicle.

In some circumstances it may be desirable to fit a "dummy" breaker, that is, a device providing permanently closed connections between the line and load terminals as required, and not including the overload disengagement mechanism and other safety features of an operable breaker, in circuit breaker receiving cubicles using the same racking mechanism required to accept a suitable operable circuit breaker. Circuit protection is then provided by "downstream" breakers.

The art includes mechanisms providing a keyed locking mechanism operable to prevent the dummy breaker from being withdrawn without the key being present, reducing the chance that a dummy breaker may be withdrawn mistakenly. As a rule, it is desirable to be able to lock a dummy breaker in the Connect position, but it is not desirable to be able to thus lock an operable breaker. Hence, an interlock device must be provided to distinguish between dummy and operable breakers and allow locking only dummy breakers in the Connect position.

Prior art mechanisms for providing the various interlock and features discussed above, and others known to those in the art, have tended to be undesirably complicated and expensive. In particular, interlocked lockable breaker racking mechanisms provided prior to the present invention have required two separate keys for locking the breaker type detection means (for example, to ensure that only dummy breakers can be locked in the Connect position), and for locking the racking device in a desired position. This involves excessive complexity.

The prior art is generally summarized by U.S. Pat. No. 5,278,722 to Peruso, which is commonly assigned with the present invention to Siemens Energy and Automation, Inc. and by the assignee's publications Nos. SG3258-01 and SG3268-03 describing commercially available products. The Peruso patent teaches a racking mechanism for switchgear, including operable or dummy circuit breakers. As described therein, the racking mechanism includes a screw block translated by rotation of a lead screw device to rack a circuit breaker into engagement with the appropriate line and load contacts. The lead screw assembly is operable by a crank having a shield arranged such that the breaker can only be moved between the Disconnect and Connect positions when the appropriate crank is inserted into the racking mechanism. Matching apertures in sliding and stationary cam assemblies are provided to receive the hasp of a padlock for locking the breaker assembly in any of several desired positions. The Peruso patent teaches trip-free interlock mechanisms, for example, precluding racking a breaker into the Connect position when its contacts are closed.

As will be apparent from review of the present application with respect to Peruso, the present application describes numerous improvements on the basic Peruso mechanism. Where not discussed specifically, details of the racking assembly according to the invention can be identical to those shown by Peruso and exemplified by commercial products forming part of the prior art applicable to this invention.

In particular, it was desired to provide an interlock mechanism which allows only breakers of the correct rating and/or type (i.e., operable or dummy breakers) to be locked in the Connect position, while also simplifying the locking mechanism provided to secure the breaker in one or more desired conditions or positions. The result would be a reduction in cost and an improvement in functionality.

OBJECTS AND SUMMARY OF THE INVENTION

It is therefore an object of the invention to provide an improved circuit breaker racking and interlock mechanism that is simpler and has improved functionality than those in the prior art, while providing all of the same control and interlock functions afforded by the prior art.

It is a more specific object of the invention to provide an interlock mechanism for switchgear racking capable of detecting the presence of a particular type of breaker and preventing locking a breaker of the incorrect type or rating in the Connect position.

It is a further object of the invention to provide a racking mechanism capable of detecting the presence of a particular type of breaker in a particular position, and only then allowing removal of the locking key, so as to prevent removal of the breaker from the selected position absent an authorized person in possession of the appropriate key, while not allowing the locking of other types of breakers in that position.

The present invention attains these objects, and others which will appear as the discussion below proceeds, by provision of an additional interlock mechanism that may be operated when the breaker is in the Connect position. More specifically, when a sliding cam provided according to the Peruso patent is moved inwardly a breaker type detection plate provided according to the invention is moved upwardly. The breaker type detection plate can reach its full upward extension only when an upward extremity thereof fits properly within an aperture in a plate mounted on the bottom of the corresponding breaker. Therefore, if the aperture in the breaker does not match the extremity of the detection plate, the sliding cam cannot be moved inwardly through the full extent of its travel. If the sliding cam can be moved to its inwardmost position, then a protruding pin of a key lock, the pin being modified according to the invention, can be extended fully, through a keyhole-shaped aperture in the sliding cam. Only at that point can the key be removed from the lock. Therefore, the key can be removed only when the appropriate breaker has been fully racked to the Connect position. When the key has been removed, the breaker cannot be moved out of the Connect position. Where, for example, a dummy breaker has been installed, it cannot be racked from the Connect position except when operated by the individual in possession of the key.

At the user's option, the same facility can be utilized to preclude removal of operable breakers if fitted with appropriate interlock plates. Under typical circumstances, it is desirable to prevent any locking of an operable breaker in place; in those cases, the interlock mechanism is provided with appropriate components preventing removal of the key, and so that an operable breaker cannot be locked in the Connect position.

BRIEF DESCRIPTION OF THE DRAWINGS

The invention will be better understood if reference is made to the accompanying drawings, in which:

FIG. 3 is a plan view of the mechanism, in the opposite orientation, with the racking mechanism in the Disconnect position;

FIGS. 4 and 5 are cross-sections along line 4—4 of FIG. 3, showing the lock pin withdrawn and fully extended, respectively;

FIG. 6 is a perspective view of the assembly of the sliding cam and other components of the racking mechanism;

DESCRIPTION OF THE PREFERRED EMBODIMENTS

Figure 8:
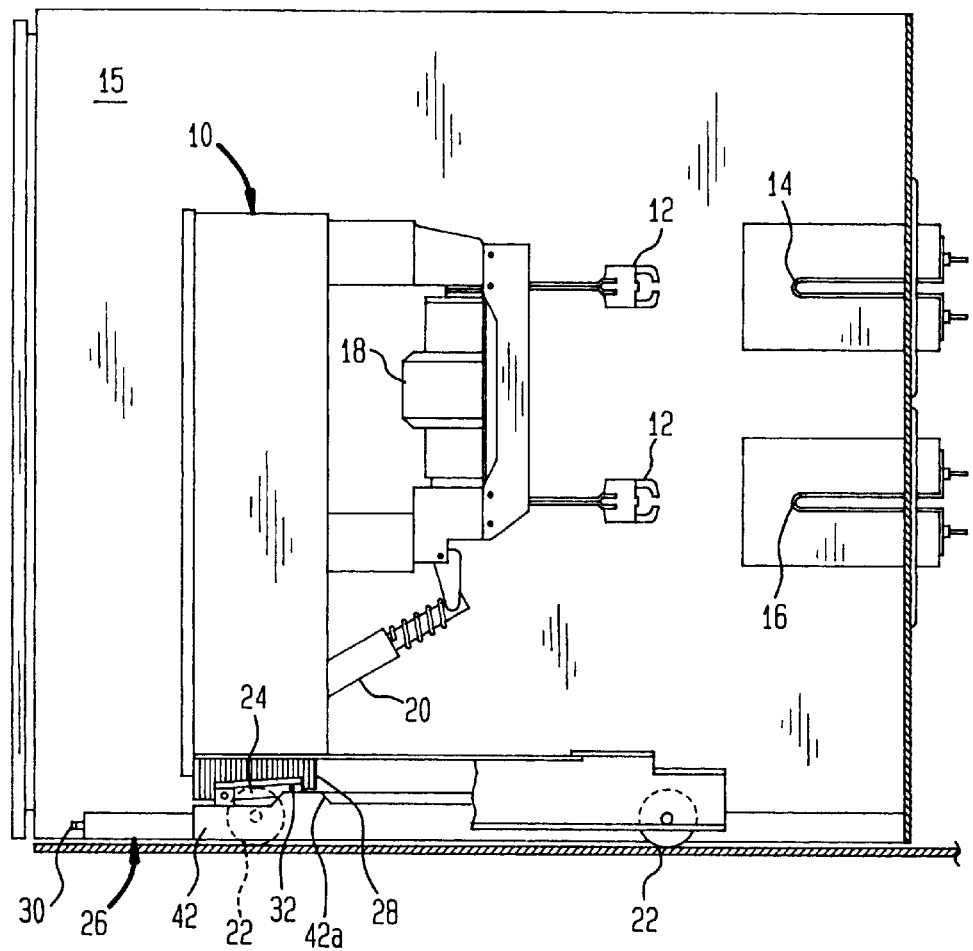
FIG. 8 is a schematic side view of the breaker and cubicle, illustrating the manner in which the breaker is connected to the bus bars and circuits being controlled.

Before beginning detailed discussion of the racking mechanism of the invention and its operation, reference is made to FIG. 8, showing the manner in which a breaker fits into a cubicle for connection to the line and load connections. Thus in FIG. 8, a breaker 10 is shown in the Disconnect position in which pairs of primary disconnects 12 are spaced a good distance from the corresponding "stabs" 14 and 16, i.e., elements connected to line power and to a load. Typically, stabs 14 and 16 are separated from the disconnects 12 on the breaker by a shutter assembly opened only when the disconnects 12 approach the respective stabs 14 and 16, i.e., during racking of a breaker. The shutter assembly is not shown in FIG. 8 as it is conventional.

The disconnects 12 on the breaker are interconnected by a vacuum interrupter assembly 18, also generally conventional, and which can be operated by hand or responsive to detection of an overload, as determined by a current-sensing mechanism within the cabinet of breaker 10. An actuator rod 20 forms part of this mechanism.

As mentioned above, the breaker assembly 10 is too heavy to be inserted fully into the cubicle 15, i.e., to be urged into the Connect position by hand. Breaker 10 is therefore mounted on rollers 22 riding on the floor of the cubicle 15 as shown. When a breaker 10 is first inserted into cubicle 15, it is pushed into the cubicle until a pivoted toggle 24 on the racking mechanism 26 is in position to interact with a mating vertical surface 28 on the breaker 10. Thereafter, the breaker is urged further into the cubicle by an operator's rotating a lead screw 30 driving toggle 24 inwardly.

Figure 1:
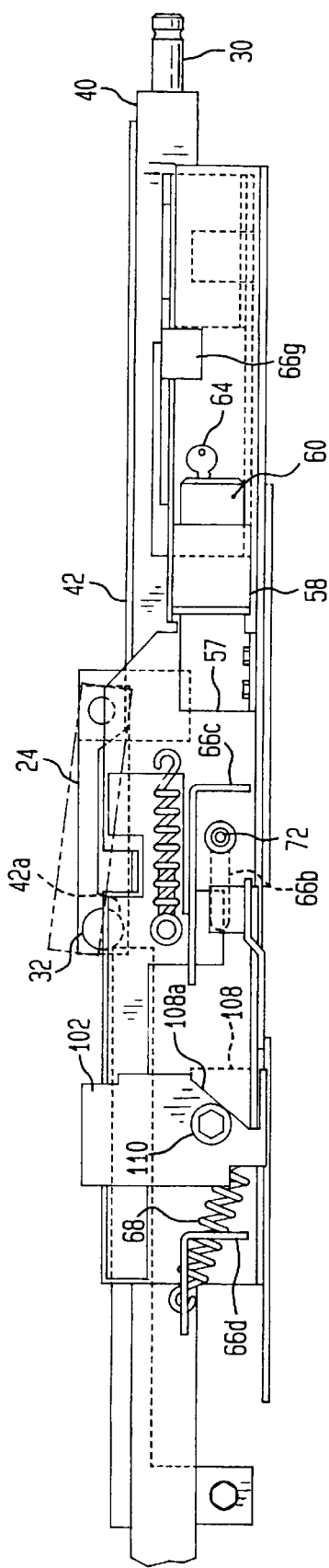
FIGS. 1 and 2 are elevation views of the racking mechanism according to the invention, in the Disconnect and Connect positions, respectively.
Figure 2:
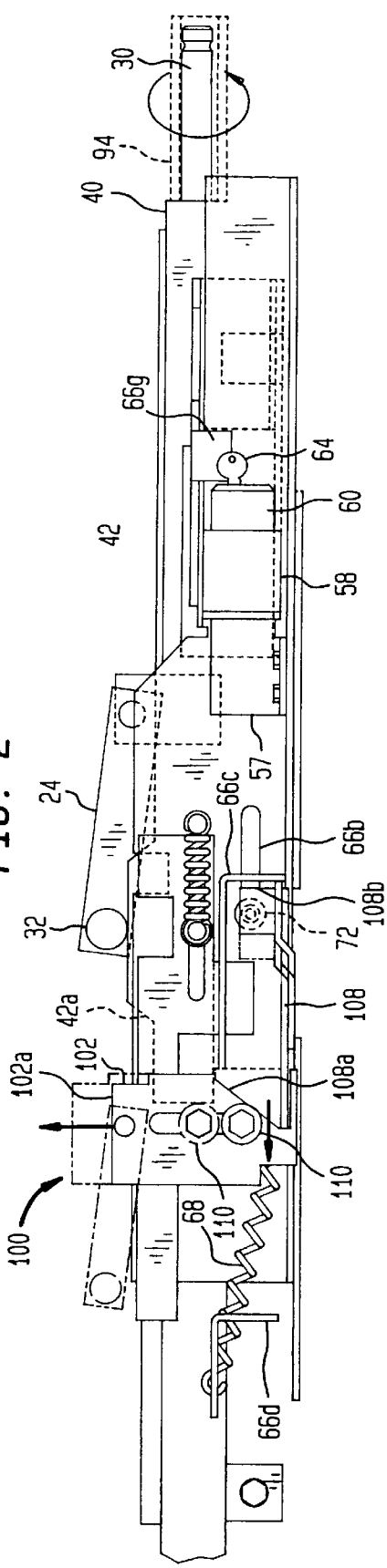

FIG. 8 shows the toggle 24 in a raised position in which its distal end can contact the vertical surface 28 and urge the breaker 10 into the cubicle 15, that is, rightwardly in FIG. 8. (See FIGS. 1 and 2.) The distal end of toggle 24 is raised upwardly when a roller 32 on its distal end rides upwardly along a sloping cam surface 42a provided on a moving cam 42. In this connection, FIG. 1 shows the toggle 24 in its horizontal position in full, and shows the distal end of toggle 24 in its raised position in dot-dashed lines, while FIG. 2 shows toggle 24 having had its end raised in full, and shows the toggle in a fully-racked position in dot-dashed lines. Roller 32 rides up cam surface 42a when cam 42 is moved leftwardly with respect to FIGS. 1 and 2, and rightwardly with respect to FIGS. 6 and 8. Cam 42 is moved when the end of an actuating crank 94, partially shown in phantom in FIG. 2, is urged over the end of lead screw 30, forcing a racking guard 40 inwardly, against the bias of spring 82. As shown in FIG. 6, guard 40 is fixed to moving cam 42, including lifting surface 42a, lifting roller 32 upwardly so that the inward end of toggle 24 can engage the vertical surface 28 of the breaker 10. At the same time roller 32 is also lifted out of a notch 70c formed in a fixed cam 70, allowing the racking assembly to be operated. This structure is essentially conventional and is provided here for completeness.

A sliding cam 66 is juxtaposed to the fixed cam 70 and is also moved inwardly (i.e., rightwardly in FIG. 6) when the collar 40 is moved by insertion of the racking crank 94. The extent of motion of the sliding cam 66 is controlled by slot 66b in the sliding cam. A bolt 74 extends through slot 66b and a mating slot formed in the fixed cam 70. A tubular member 72 is mounted on bolt 74 and secured thereby to a tang 42b formed integrally with cam 42. Cam 42 in turn is secured by bolts 78 to racking guard 40 fitting around the proximal tip of lead screw 30. As noted, racking guard 40 is urged inwardly against the bias of spring 82 when the racking crank 94 is assembled over the proximal tip of the lead screw 30. The relationship of the cams 70, 66, and 42, and the assembly thereto of the guard 40 are all generally conventional. The relative alignment of the sliding and fixed cams is further insured by a second stud member 84 which is fixed to the sliding cam 66 and passes through a slot 70b in the fixed cam 70.

First and second trip-free interlocks 66c and 66d, referred to as Test and Connect interlocks, respectively, are formed integrally with sliding cam 66. The trip-free interlocks 66c and 66d interact with a closed breaker interlock 132 depending from the circuit breaker (see FIG. 7) to ensure that the breaker can be closed only in the Test position (i.e., after having been racked inwardly a short distance from the Disconnect position) or in the Connect position, i.e., after having been racked into the Connect position. When the breaker's primary contacts are closed, member 132 drops downwardly, e.g., behind the Test trip-free interlock 66c when in the Test position and behind the Connect interlock 66d in the Connect position respectively. Member 132 prevents the breaker from being closed in other positions.

The fixed and sliding cams 70 and 66 also include a pair of cooperating notches indicated at 70c and 66e respectively into which a further interlock 90 (see FIG. 7) drops; that is, if the breaker is closed while in the Disconnect position, roller interlock 90 depending therefrom extends downwardly into the notches 70c and 66e. This prevents relative movement of the breaker with respect to the fixed cam 70, i.e., prevents racking of the breaker with the roller of interlock 90 in notch 70c. If the sliding cam 66 is then moved inwardly by assembly of the racking crank 94, angled cam surface 66f lifts the interlocking mechanism 90 vertically out of notch 70c. Again, this mechanism is essentially conventional.

Accordingly, when the sliding cam 66 is moved rearwardly by insertion of the racking crank 94, angled cam surface 66f lifts the trip-free interlock roller 90 out of notch 70c. Roller 90 then slides along the upper surface 66i of sliding cam 66 during racking of the breaker, holding the breaker trip-free during racking; i.e., until the trip-free roller 90 reaches a further sloped surface 66h on the opposite end of sliding cam, allowing it to drop downwardly, the breaker cannot be closed. Accordingly, the breaker is precluded from being closed during the racking operation. As noted, when the guard 40 is pushed rearwardly, the angled wall 42a also lifts the roller 32 of the racking toggle 24 so that it can engage mating surface 28 on the breaker (see FIG. 7), allowing the breaker to be racked inwardly by rotation of the crank 94. Again, these structures are essentially conventional, and are provided here simply for completeness.

While the circuit breaker racking mechanism provided in the prior commercial products of the assignee has been very successful in providing the required functions, it is desired to provide the customer the flexibility to specify desired functions and the manufacturer to provide the specified functions with minimal additional tooling or inventory expense.

For example, the particularly dangerous operation of removing a closed breaker while a load is applied has previously been prevented by padlocking the racking mechanism with the breaker in the Connect position. In particular, this allows locking a dummy breaker in the Connect position so that the dummy breaker cannot be inadvertently withdrawn without unlocking the padlock. Security is provided if the key to the padlock is controlled by a manager or other person having responsibility so that a technician or repairman cannot erroneously disconnect the breaker.

In general, however, it is preferred that operable breakers (as opposed to dummy breakers) cannot be locked in the Connect position. In order that the same racking mechanism can be employed with operable and dummy breakers, and allowing locking (with key removal) only when a breaker of predetermined type is present, the locking mechanism must be interlocked with a device for determining the type of breaker. Other users may wish to be able to lock a breaker in the Disconnect position, so that a breaker that has been deliberately racked from the Connect to the Disconnect position (to enable work to be performed downstream, for example), cannot be inadvertently racked and closed so as to prevent injury to workers.

From the point of view of the manufacturer of the racking mechanism, it is desirable to support each of these options and others at the minimum manufacturing expense. This requires that the basic racking mechanism be capable of inexpensive modification responsive to specific customer orders so that racking mechanisms can be customized at limited additional cost.

It is desirable therefore to provide a locking mechanism for racking breakers interlocked so that the key to the lock can only be removed when a specified type of breaker (typically a dummy breaker, but also possibly an operable breaker, depending on the desire of the customer) is fully racked into the Connect position. Preventing the key from being removed other than at this time prevents racking of the breaker out of the Connect position without the key being present; as above, the object is to preclude a technician or some other person, not cognizant of the overall system, from removing the breaker while it is activated.

More specifically, two separate functions are required: first, the racking mechanism must be capable of determining whether a breaker which has been installed conforms with the intended use of the particular cubicle within which the racking mechanism is disposed, and second, the racking mechanism must be capable of being locked in at least the Connect position with the key being removable only in that position in order that the breaker can locked only in the Connect position and only unlocked by the person responsible for the key.

Prior art devices have provided these functions. In the prior devices, the racking mechanism could be locked in any of several positions by passing the hasp of a conventional padlock through mating holes formed in relatively movable components of the racking mechanism, thus precluding their relative motion after a particular position was achieved. These holes are shown at 64 and 68 of FIG. 8 in the Peruso patent, and preclude the motion of one or both of the racking guard 40 and sliding cam 66 with respect to fixed cam 70.

The same holes are also shown in the drawings of this application inasmuch as the preferred embodiment shown is a modification of the Peruso design, and there is no need to change the tooling used to manufacture the Peruso racking mechanism to avoid punching these holes. However, these holes are not used for locking the mechanism according to the present invention.

The Peruso locking mechanism does not include any means for determining whether the breaker being racked is of the correct type, i.e., either dummy or operable. Accordingly, in the prior art devices, a separate interlocking mechanism was provided, involving a rotatable shaft extending horizontally beneath the breaker in the bottom of the cubicle, and having a rigid sensor loop disposed at its distal end. When a breaker was installed, this assembly could be rotated about its longitudinal axis so that the sensor loop rotated upwardly. The size of the sensor loop was specified in accordance with the type of breaker to be installed. The breaker then included an interlock mechanism defining an aperture of a size corresponding to the sensor loop. If the aperture was inappropriate, the loop would not rotate into the aperture, indicating that the incorrect breaker had been installed. This assembly could also be locked in the rotated position, further precluding removal of the breaker. However, a separate locking mechanism was required, that is, in addition to any provided to lock the racking mechanism itself. According to the present invention, a single lock 58 performs both functions, reducing cost.

As seen in FIGS. 4, 5, and 6, lock 58 is of a type wherein a pin member 62 is extended outwardly upon rotation of the key 64. The pin 62 is shown in its retracted position in FIGS. 4 and 6 and in its fully extended position in FIG. 5. The lock used is a modified standard commercial part. According to an important aspect of the invention, pin 62 is turned down from its regular cylindrical configuration as supplied, so as to comprise an enlarged disk-like member 62a disposed midway along a cylinder of reduced diameter. The function of disk member 62a is to allow the pin 62 to pass through a keyhole-shaped slot 66a in sliding cam 66 only when the sliding cam 66 is moved to its furthest inward position; that is, to its furthest rightward position in FIG. 6. When the sliding cam 66 is moved rightwardly as far as possible, pin 62 can be extended fully through the circular portion of the keyhole slot 66a (and through a mating hole 70a in fixed cam 70) such that circular member 62a is disposed on the right-hand side of the planar portion of the sliding cam 66, as shown in FIG. 5. The sliding cam 66 is biased leftwardly in FIG. 6 by a spring 68, and can slide leftwardly a short distance after pin 62 is fully extended, until the smaller slot portion of the keyhole-shaped slot 66a abuts the reduced diameter portion of pin 62. This precludes leftward movement of pin 62 and release of sliding cam 66 unless the sliding cam 66 is again moved rightwardly, allowing the pin 62 to be retracted by turning key 64.

The design of lock 58 is such that key 64 can be removed from the mechanism 60 only when pin 62 is fully extended. Therefore, the key 64 can be removed only when the pin 62 extends fully through keyhole-shaped slot 66a in sliding cam 66, as shown in FIG. 5. Therefore, key 64 can be removed only if the sliding cam 66 has previously been moved to its fully inward position.

If the sliding cam 66 is not pushed rearwardly sufficiently to allow disc portion 62a of pin 62 to pass through keyhole slot 661, the breaker can still be secured trip-free by extending pin 62 far enough that its cylindrical portion is received by the narrow slot portion of keyhole slot 66a; this prevents sliding cam 66 from sliding rearwardly, as would otherwise occur upon removal of racking crank 94, and prevents trip-free roller 90 from dropping downwardly. However, under these circumstances the key 64 cannot be removed from the lock and so the ultimate security of key removal is not afforded.

It is desired, as noted, to be able to prevent locking of other than predetermined types of circuit breakers into desired positions. In particular, it is desired that dummy breakers should (for example) be locked into the Connect position, and the key removed, so that the dummy breakers cannot be inadvertently removed, causing a dangerous situation to arise. According to the present invention, therefore, the sliding cam is provided with a downwardly extending tang 66g. After the correct breaker has been racked into the Connect position, the user will typically put his right thumb on tang 66g, and move the sliding cam 66 approximately ¼ inch rearwardly, this distance corresponding to the elongation of the narrow portion of keyhole-shaped slot 66a. This permits the pin 62 of the lock having integral circular member 62a to pass through hole 70a in the fixed cam and the mating circular portion of the keyhole-shaped slot 66a in the fixed cam 66. Only at that point can the key 64 be removed from the lock 58. Thus, the user must specifically use both hands to move the sliding cam 66 the additional distance rearwardly and remove the key. Again, the intention is to prevent the key being removed inadvertently, but only after planning and thought.

According to a further aspect of the present invention, the sliding cam 66 can only be thus moved rearwardly, allowing key 64 to be removed, when the correct breaker has been racked into the cubicle. That is, if the racking mechanism has been specified for use with a dummy breaker, an additional breaker type detection interlock mechanism provided according to the invention precludes locking and removal of the key unless a dummy breaker has in fact been installed. Other types of breakers can similarly be detected, or their current-carrying capability confirmed.

The breaker type detection interlocking mechanism 100 provided according to the invention is shown in side view in FIGS. 1 and 2. FIG. 2 shows the interlock mechanism 100 in its normal position in solid lines and in an activated position, which can be taken only when the breaker of the correct type is present, in dashed lines.

The breaker type detection interlock mechanism 100 includes a vertically sliding plate 102 moved from the position shown in solid lines in FIG. 2 to that shown in dashed lines when the operator moves the sliding cam 66 an additional ¼ inch rearwardly by pressing tang 66g as described above. This is only possible if the upper end portion 102a of plate 102 fits into a corresponding aperture 104a defined by the breaker. Plate 102 thus defines a mechanical sensor for determining whether the corresponding breaker has been racked into the Correct position.

Figure 7:
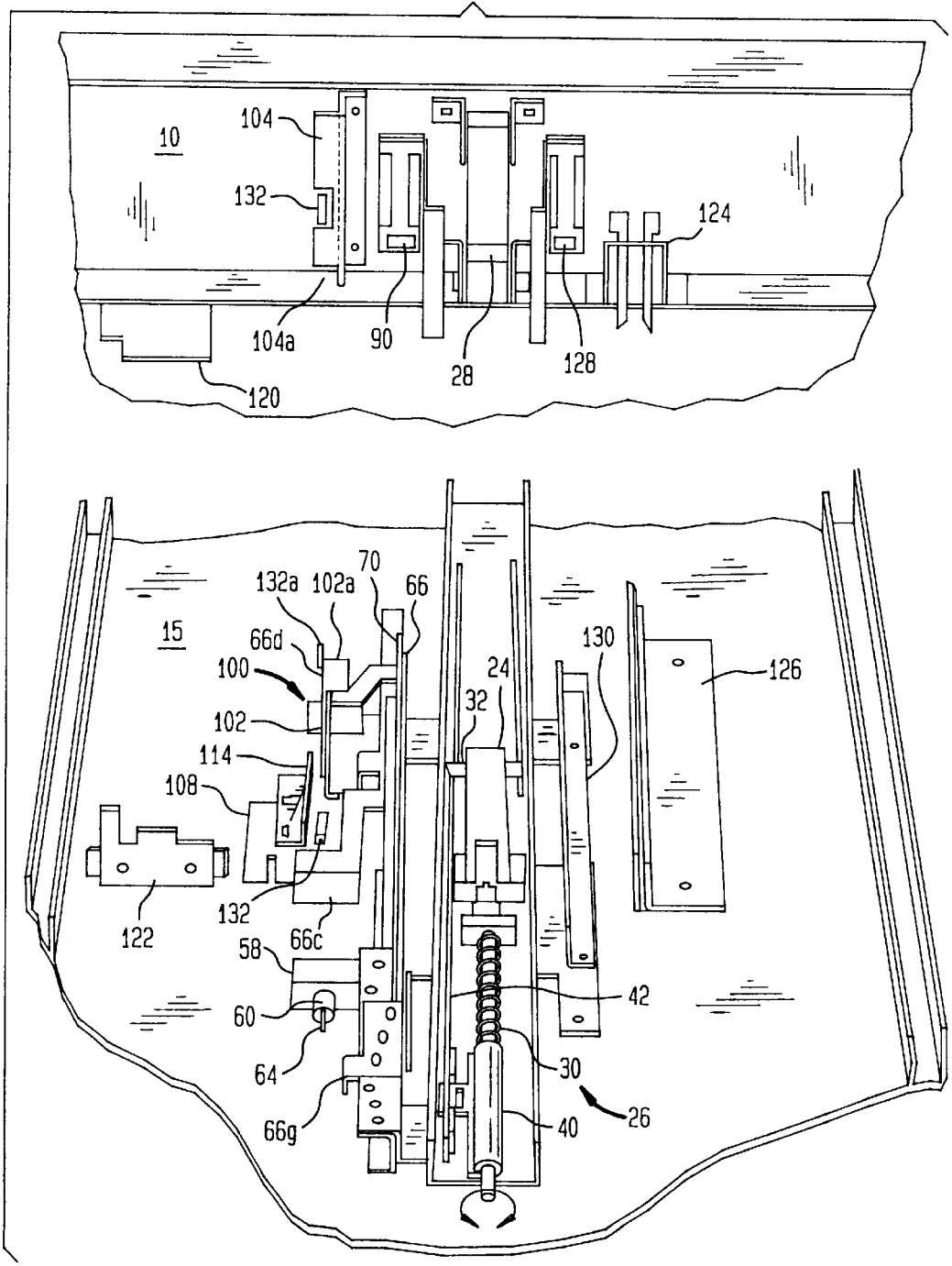
FIG. 7 is a perspective view showing the relationship of the components mounted on the underside of an operable circuit breaker and its interaction with the racking mechanism according to the invention.

More specifically, and as shown in FIGS. 3 and 7, the upper end portion 102a of plate 102 of the breaker type interlock assembly 100 is bent to form a generally planar surface fitting into the aperture 104a. Breaker bottom plate 104 is provided with an aperture 104a sized and located according to the intended use of breaker 10 for receiving the upper end 102a of the plate 102. Various types and capacities of breakers can be fitted at manufacture with breaker plates 104 having corresponding notches; the corresponding plate 102 is then supplied with the racking mechanism. Therefore, unless the breaker plate with its notch 104a and breaker type detection 100 mechanism with its upper end portion 102a correspond to one another, the plate 102 cannot be moved upwardly; hence the sliding cam 66 cannot be moved rearwardly, the pin 62 of the lock cannot protrude fully through the keyhole-shaped slot 66a, and the key 64 cannot be removed.

As noted, the plate 102 is moved vertically upon horizontal movement of the sliding cam 66 by the user's pushing cam 66 a small additional distance rearwardly by finger pressure on tang 66g. The horizontal movement of sliding cam 66 is converted to vertical movement of plate 102 by an angled cam surface 108a formed on a horizontally sliding cam plate 108, seen in side view in FIGS. 1 and 2, in plan view in FIG. 3, and in perspective in FIG. 7. Angled cam surface 108a abuts a freely-rotating roller 110 mounted to vertically moving plate 102, so that the horizontal movement of plate 108 is converted into vertical movement of plate 102. Spring 114 (FIG. 3) urges the angled cam surface 108a against roller 110. Plate 108 also includes a vertical tang 108b abutting the Test position trip-free interlock 66, of sliding cam 66.

Therefore, when the sliding cam 66 is moved to its rearwardmost position by a user pressing against tang 66g, the trip-free interlock 66c abuts tang 108b of sliding plate 108 and moves plate 108 rearwardly as well. Angled cam surface 108a is then urged against roller 110 and moves plate 102 upwardly. If the breaker interlock plate 104 corresponding to plate 102 has been installed, upper end portion 102a of plate 102 will fit within the aperture 104a of the interlock plate 104. This permits the pin 62 of lock 58 to protrude fully through the enlarged keyhole slot 66a, allowing the key 64 to be removed. When the user then releases finger pressure on tang 66g, the sliding cam 66 slides rearwardly, responsive to bias provided by spring 68, so that the reduced-size slot portion of keyhole 66a fits around the pin 62, and so that circular member 62a prevents pin 62 from being withdrawn back into the lock. Accordingly, subsequently unlocking the device requires that the sliding cam be again pushed rearwardly by pressure on tang 66g.

The drawings also show certain generally conventional features of the interaction of circuit breakers and their racking mechanisms briefly described here for completeness. For example, FIG. 7 shows the cooperation between a breaker rating plate 120 and a corresponding interlock plate 122 mounted on the floor of the cubicle. If the rating plate 120 does not match the shape of interlock plate 122, the breaker cannot be racked into position. Similarly, the breaker makes ground contact with the cubicle by way of a gripping assembly 124, which makes contact with grounding plate 126 mounted to the floor of the cubicle. A spring dump roller 128 is also mounted to the bottom of the breaker and rides along a spring dump cam 130, ensuring that the springs operating the contacts are fully discharged before the breaker can be removed from the cubicle 15.

As noted, the breaker 10 also includes a closed breaker interlock 132 which amounts to a vertically moving steel strip. The closed breaker interlock 132 extends downwardly from the bottom of the breaker when the breaker is in its closed position. When the breaker is in the Test position, that is, before racking, the interlock 132 fits behind the test position interlock arm 66c as shown at 132$_t$ in FIGS. 3 and 7; when the breaker has been fully racked into the connected position, the closed breaker interlock 132 fits behind the Connect position trip-free interlock arm 66d, as shown at 132$_c$. Hence, the breaker can only be closed when it is in either the Test or Connect positions. Furthermore, if the blade 132 is down in the Test position 132$_t$, the breaker cannot be racked inwardly because the racking mechanism cannot be moved rearwardly. This prevents racking of a closed breaker. These cooperating components are generally conventional. Closed breaker interlock 132 protrudes through a notch formed for this purpose in the closed breaker interlock plate 104 provided according to the invention. See FIG. 7.

While a preferred embodiment of the invention has been shown and described in detail, the invention is not to be limited thereby, but only by the following claims.

What is claimed is:

1. In combination, a cubicle and a circuit breaker that can be either of operable type or of dummy type,
    the cubicle comprising:
        (1) a racking mechanism for moving the circuit breaker between Disconnect, Test, and Connect positions, and
        (2) an interlock mechanism cooperating with the circuit breaker for:
            (a) preventing racking of the circuit breaker, if closed and of operable type, into or out of the cubicle,
            (b) opening the primary contacts of the circuit breaker, if of operable type, upon motion thereof into or out of the cubicle, and
            (c) preventing closing of the primary contacts of the circuit breaker, if of the operable type, except when racked into the Test or Connect positions, and
    wherein the interlock mechanism further comprises:
        (1) locking means lockable to secure the circuit breaker in a desired position; and
        (2) breaker type detection means cooperating with the locking means, such that the locking means can also be locked to preclude removal of the circuit breaker, if of predetermined type of the two types from the Connect position, but cannot be locked to similarly preclude removal of the circuit breaker, if of the other type, from the Connect position.

2. The combination of claim 1, wherein the locking means can be operated to secure the circuit breaker, if of the predetermined type, in a trip-free condition.

3. The combination of claim 1, wherein the locking means is lockable to preclude removal of the circuit breaker, if of the predetermined type, by preventing operation of the racking mechanism.

4. The combination of claim 3, wherein the locking means can be locked to prevent operation of the racking mechanism to remove the circuit breaker from the Connect position only if the circuit breaker is of the predetermined type.

5. The combination of claim 1, wherein the breaker type detection means comprises:
    a mechanical sensor operated upon any attempt to lock the racking mechanism with the circuit breaker in the Connect position, the sensor permitting locking of the racking mechanism in the Connect position only of a circuit breaker of the predetermined type.

6. The combination of claim 5,
    wherein the mechanical sensor comprises a member of predetermined size chosen to correspond to a circuit breaker of the predetermined type, and
    wherein the circuit breaker defines an aperture located and sized for receiving a corresponding member of predetermined size when in the Connect position.

7. The combination of claim 6,
    wherein the breaker type detection means comprises means for urging the member toward an aperture defined by the circuit breaker, and
    wherein the means for urging must be operated, in order to determine whether the member corresponds to the circuit breaker, before the circuit breaker can be locked in the Connect position.

8. The combination of claim 7, wherein, if the means for urging cannot be moved at least a predetermined additional distance after the circuit breaker has been racked into the Connect position, the locking means is prevented from being locked in order to preclude operation of the racking mechanism.

9. The combination of claim 8,
wherein the locking means comprises a manually operable lock comprising a pin extending axially outwardly when locked,
the pin, if extended when the racking mechanism is in the Connect position, preventing operation of the racking mechanism.

10. The combination of claim 9, wherein the lock is operated by a key that is removable only when the pin protrudes into a full outward position.

11. The combination of claim 9, wherein, when the lock is operated, the pin of the lock passes through cooperating orifices in a fixed portion of the racking mechanism and a moving portion of the racking mechanism moved in order to rack the breaker, whereby the lock can be operated to prevent motion of the moving portion.

12. The combination of claim 11, wherein the moving portion comprises a sliding cam that moves upon operation of the racking mechanism, the lock being operable to secure the sliding cam in position to cooperate with a trip-free interlock mechanism comprised by the circuit breaker of the operable type, whereby the circuit breaker can be secured in a trip-free condition.

13. The combination of claim 11, wherein the pin comprises:
a first portion of reduced diameter and a disc member of larger diameter, the pin fitting within a keyhole aperture in the sliding cam;
the aperture having a circular portion for receiving the disc member and a relatively narrow slot for receiving the reduced diameter portion, the aperture being formed in the sliding cam to receive the pin in the narrow slot to lock the sliding cam and thereby secure the circuit breaker of the operable type in the trip-free condition,
whereby the sliding cam must be moved a predetermined additional distance beyond the position of the sliding cam when the circuit breaker has been racked into the Connect position, in order that the circular portion of the keyhole aperture can be aligned with the pin to permit insertion of the circular portion of the pin thereinto, and
wherein the sliding cam may be thus moved the additional predetermined distance only when the circuit breaker of the predetermined type is in the Connect position,
whereby only the circuit breaker of the predetermined type may be locked in the Connect position.

14. The combination of claim 13, wherein the keyhole aperture in the sliding cam is oriented such that the sliding cam must be manually urged against a spring bias past the position of the sliding cam during racking of the circuit breaker into the Connect position, in order that the pin can be fully extended and the key withdrawn from the lock, effectively locking said circuit breaker of the predetermined type in the Connect position.

15. The combination of claim 14, wherein the sliding cam comprises a contact surface against which a user must exert force to urge the sliding cam past the position of the sliding cam during racking of the circuit breaker into the Connect position, the contact surface being located such that the user must use both hands to do so while operating the lock.

16. The combination of claim 1,
wherein the interlock mechanism comprises a fixed cam and a sliding cam, for cooperating with a trip-free actuator on the circuit breaker of the operable type, whereby the actuator is operated by the fixed cam to maintain the circuit breaker in a trip-free condition during racking thereof between the Test and Connect positions,
the locking means further being operable to lock the sliding cam in position to secure the circuit breaker in a trip-free condition while in the Connect position.

17. The combination of claim 16, wherein the locking means comprises a lock having a pin extending axially outwardly when operated, the pin, if extended when the circuit breaker of the operable type is in the Disconnect position, preventing motion of the sliding cam and thereby locking the breaker in the trip-free condition.

18. The combination of claim 17, wherein the lock is operated by a key removable only when the pin protrudes into a full outward position.

19. The combination of claim 18,
wherein the pin of the lock comprises
a first portion of reduced diameter; and
a disc member of larger diameter; and
the sliding cam includes a keyhole aperture formed therein;
the pin fitting within the aperture formed in the sliding cam;
the aperture having a circular portion for receiving the disc member and a relatively narrow slot portion for receiving the reduced diameter portion;
the narrow slot portion of the keyhole aperture receiving the reduced-diameter portion of the pin to lock the sliding cam and thereby secure the circuit breaker of the operable type in the trip-free condition;
wherein the sliding cam must be located such that the circular portion of the aperture is aligned with the pin to permit insertion of the circular portion of the pin thereinto;
wherein the sliding cam may be thus located only when the circuit breaker of the predetermined type, corresponding to sensor means of the breaker type detection means, is in the Connect position; and
whereby only circuit breakers of the predetermined type may be locked in the Connect position.

20. The combination of claim 19, wherein the sliding cam must be urged against a spring bias past the position of the sliding cam during racking of the circuit breaker into the Connect position, in order that the circular portion of the keyhole aperture can be aligned with the pin to permit insertion of the circular portion of the pin thereinto.

21. The combination of claim 16, wherein the breaker type detection means comprises a mechanical sensor operated upon any attempt to lock the racking mechanism with the circuit breaker in the Connect position, the sensor permitting locking of the racking mechanism only with the circuit breaker of the predetermined type in the Connect position.

22. The combination of claim 21, wherein the mechanical sensor comprises a member of predetermined size chosen in correspondence to identification of the circuit breaker of the predetermined type, and wherein the circuit breaker defines an aperture adapted for receiving a corresponding member of predetermined size when in the Connect position.

23. The combination of claim 22, wherein the breaker type detection means comprises means for urging the member toward an aperture defined by the circuit breaker in the cubicle, wherein the means for urging must be operated in order to determine whether the member corresponds to the circuit breaker in the cubicle before the circuit breaker can be locked in the Connect position.

24. The combination of claim 23, wherein if the means for urging cannot be moved at least a predetermined distance after the circuit breaker has been racked into the Connect position, the locking means is prevented from being locked in order to prevent operation of the racking mechanism, whereby movement of the circuit breaker away from the Connect position can be precluded by operation of the locking means only if the member of predetermined size is received within a corresponding aperture defined by the circuit breaker.

25. The combination of claim 24, wherein the means for urging is operated by motion of a sliding cam, such that the sliding cam must be pushed past the position of the sliding cam taken with the circuit breaker in the Connect position to allow said locking means to be operated.

* * * * *